US011481778B2

(12) United States Patent
Molnar et al.

(10) Patent No.: US 11,481,778 B2
(45) Date of Patent: Oct. 25, 2022

(54) VALIDATING ENCRYPTED DATA FROM A MULTI-LAYER TOKEN

(71) Applicant: The Toronto-Dominion Bank, Toronto (CA)

(72) Inventors: Matthew Randolph Molnar, Farmington Hills, MI (US); Jonathan K. Barnett, Oakville (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1300 days.

(21) Appl. No.: 15/286,734

(22) Filed: Oct. 6, 2016

(65) Prior Publication Data
US 2017/0124558 A1 May 4, 2017

Related U.S. Application Data

(60) Provisional application No. 62/249,148, filed on Oct. 30, 2015.

(51) Int. Cl.
*G06Q 20/40* (2012.01)
*G06Q 20/38* (2012.01)
(Continued)

(52) U.S. Cl.
CPC ........... *G06Q 20/405* (2013.01); *G06Q 20/10* (2013.01); *G06Q 20/3829* (2013.01);
(Continued)

(58) Field of Classification Search
CPC . H04L 9/32–329; H04W 12/06; G06Q 20/10; G06Q 20/3829; G06Q 20/40–49
(Continued)

(56) References Cited

U.S. PATENT DOCUMENTS 6,128,735 A 10/2000 Goldstein
8,036,941 B2 10/2011 Bennett et al.
(Continued)

OTHER PUBLICATIONS

White, How Computers Work 7th Ed, p. 4 (Year: 2003).*

*Primary Examiner* — Mohammad A. Nilforoush
*Assistant Examiner* — Cristina Owen Sherr
(74) *Attorney, Agent, or Firm* — Duane Morris LLP

(57) ABSTRACT

A message processing server includes a message processor and a database of multi-layer tokens. Each token in the database includes a plurality of encrypted data layers. The first layer includes a first data pointer. A primary layer includes the first layer and identifies a reference data value. The message processor receives from a communications device an authentication request identifying a first data value, validates the authentication request from the first data value and the reference data value configured in one of the multi-layer tokens, receives a first authorization message including a first cryptographic key, derives a first decrypted data layer from the first cryptographic key and the first encrypted data layer of the one multi-layer token, and validates the first data pointer by receiving confirmation of the first data pointer pointing to a database entry comprising a second data value less than the reference data value.

20 Claims, 8 Drawing Sheets

(51) Int. Cl.
*H04L 9/40* (2022.01)
*H04L 9/32* (2006.01)
*G06Q 20/10* (2012.01)
*H04W 12/069* (2021.01)

(52) U.S. Cl.
CPC ........... *G06Q 20/40* (2013.01); *H04L 9/3213* (2013.01); *H04L 9/3226* (2013.01); *H04L 63/08* (2013.01); *H04W 12/069* (2021.01); *H04L 2209/56* (2013.01)

(58) Field of Classification Search
USPC .......................................................... 705/71
See application file for complete search history.

(56) References Cited

U.S. PATENT DOCUMENTS

| | | | |
|---|---|---|---|
| 8,140,442 | B2 | 3/2012 | Heyer |
| 8,363,827 | B2 | 1/2013 | Yap |
| 8,688,594 | B2 | 4/2014 | Thomas et al. |
| 8,914,632 | B1 | 12/2014 | Shankar |
| 2003/0056108 | A1 | 3/2003 | Mont |
| 2005/0204128 | A1* | 9/2005 | Aday ................... H04L 9/0825 713/152 |
| 2006/0123465 | A1 | 6/2006 | Ziegler |
| 2006/0282901 | A1 | 12/2006 | Li |
| 2007/0058548 | A1 | 3/2007 | Babonneau |
| 2007/0169175 | A1 | 7/2007 | Hall |
| 2008/0183593 | A1 | 7/2008 | Dierks |
| 2008/0244721 | A1* | 10/2008 | Barrus ................ G06F 21/6254 726/9 |
| 2009/0198991 | A1 | 8/2009 | Owens |
| 2010/0042534 | A1* | 2/2010 | Moran ................... G06Q 50/16 705/38 |
| 2014/0344153 | A1 | 11/2014 | Raj |
| 2015/0032626 | A1 | 1/2015 | Dill |
| 2015/0127524 | A1 | 5/2015 | Jacob |
| 2015/0249651 | A1 | 9/2015 | Okamoto |
| 2015/0262246 | A1 | 9/2015 | Stack |
| 2015/0288663 | A1 | 10/2015 | Watanabe |
| 2015/0379295 | A1 | 12/2015 | Branton |
| 2016/0085955 | A1 | 3/2016 | Lerner |
| 2016/0119296 | A1 | 4/2016 | Laxminarayanan |
| 2016/0247151 | A1* | 8/2016 | Gupta ................ G06Q 20/3821 |
| 2016/0294562 | A1 | 10/2016 | Oberheide |
| 2017/0283415 | A1 | 10/2017 | Kurita |

\* cited by examiner

VALIDATING ENCRYPTED DATA FROM A MULTI-LAYER TOKEN

RELATED APPLICATIONS

This patent application claims the benefit of the filing date of U.S. Patent Application Ser. No. 62/249,148, filed Oct. 30, 2015, the contents of which are incorporated herein by reference.

FIELD OF THE INVENTION

This patent application relates to a method and network for accessing encrypted data.

BACKGROUND

In a high-value financial transaction (e.g. purchase of home, land, business or automobile), the seller may prefer to deal with a buyer who has secured pre-approved financing.

Moran (U.S. Pat. No. 8,108,303) describes a web portal for approval of a loan of a pre-determined amount to be used to purchase a home. When the loan is approved, the portal issues a card that signifies to the seller or the seller's representative that the buyer has been approved for a pre-determined loan amount.

SUMMARY

This patent application discloses a message processing server and associated method that validates confidential information using multi-layer tokens.

In accordance with a first aspect of the disclosure, there is provided a message processing server that includes a message processor and a token database. The token database includes multi-layer tokens. Each token in the database includes a plurality of encrypted data layers. A first of the encrypted data layers includes a first data pointer. Another of the encrypted data layers includes the first layer and identifies a reference data value.

The message processor is configured to (i) receive an authentication request that identifies a first data value, (ii) validate the authentication request from the first data value and the reference data value that is configured in one of the multi-layer tokens, (iii) receive a first authorization message that includes a first cryptographic key, (iv) derive a first decrypted data layer from the first cryptographic key and the first encrypted data layer of the one multi-layer token, and (v) validate the first data pointer by receiving confirmation of the first data pointer pointing to a database entry comprising a second data value less than the reference data value.

In accordance with a second aspect of the disclosure, there is provided a method of validating encrypted data. The method involves a message processor receiving an authentication request that identifies a first data value, and validating the authentication request from the first data value and a reference data value that is configured in a multi-layer token.

The multi-layer token includes a plurality of encrypted data layers. A first of the encrypted data layers includes a first data pointer. Another of the encrypted data layers includes the first encrypted data layer and identifies the reference data value.

The method also involves the message processor receiving a first authorization message that includes a first cryptographic key, deriving a first decrypted data layer from the first cryptographic key and the first encrypted data layer of the multi-layer token, and validating the first data pointer by receiving confirmation of the first data pointer pointing to a database entry comprising a second data value less than the reference data value.

In one implementation, the message processor receives a valuation message identifying an adjustment value, updates the reference data value with the adjustment value, and validates the authentication request from the first data value and the updated reference data value.

In one implementation, the message processor updates the reference data value by decrypting the another encrypted data layer with a master cryptographic key, updates the reference data value to include the adjustment value, and applies the master cryptographic key, the first encrypted data layer and the updated reference data value as inputs to a cryptographic algorithm. The message processor may also incorporate the adjustment value into the first encrypted data layer of the one multi-layer token.

As will become apparent, although a customer can use the multi-layer token to complete a transaction that involves a series of payments, the multi-layer token and associated method and message processing server also allows a person to secure confidential information and for the token recipient to quickly validate that information.

BRIEF DESCRIPTION OF THE DRAWINGS

An exemplary message processing network, message processing server, and method of validating encrypted data will now be described, with reference to the accompanying drawings, in which.

DETAILED DESCRIPTION

Message Processing Network—Overview

Figure 1:
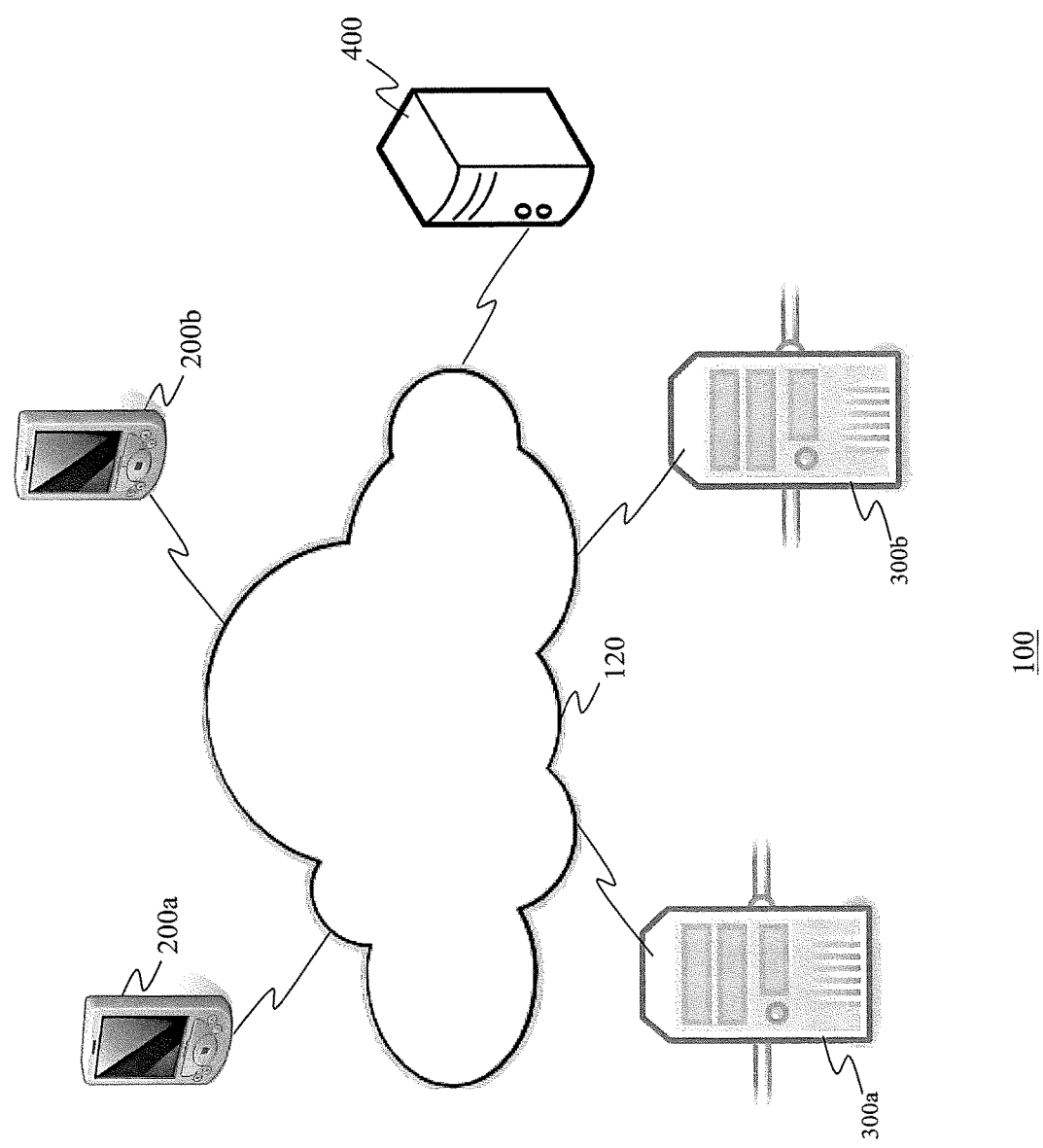
FIG. 1 is a schematic view of the message processing network, depicting a message processing server and a plurality of communications devices.

FIG. 1 is a schematic view of a message processing network, denoted generally as 100. As shown, the message processing network 100 comprises a first communications device 200a, a second communications device 200b (collectively, communications devices 200), a payer financial institution server 300a, a payee financial institution server 300b (collectively, financial institution servers 300), and a message processing server 400.

Although the message processing network 100 is shown comprising only two communications devices 200 and only two financial institution servers 300, the message processing network 100 typically comprises a plurality of the communications devices 200 and a plurality of the financial institution servers 300. Moreover, although the message processing network 100 is shown comprising only a single message processing server 400, the message processing network 100 may include a plurality of the message processing servers 400.

The communications devices 200 communicate with the message processing server 400 via a wide area network 120, such as the Internet. One or more of the communications devices 200 may be implemented as a wireless communications device configured to operate within a wireless network. As non-limiting examples, one or more of the wireless communications device 200 could be implemented as a wireless-enabled tablet computer, a wireless-enabled PDA, or a smart phone. Accordingly, the wide area network 120 may include a mobile communications network that is configured as a WiFi network, a cellular network, or a combination thereof.

Each financial institution server 300 is associated with and is administered by a respective financial institution, and is configured to communicate with the message processing server 400 and the other financial institution server(s) 300 via the wide area network 120. Each financial institution server 300 maintains a secure accounts database that includes groups of related database records. Each records group is uniquely associated with a respective financial account of one of its customers, and typically identifies an account number of the associated financial account, and the credit/deposit entries to the associated financial account.

Each financial institution server 300 also maintains a database of registered users of the associated financial institution. In one example, the database saves, for each registered user, authentication credentials (e.g. user identifier, user authentication code (e.g. password, passcode)) that allow the associated user to authenticate to the financial institution server 300.

The message processing server 400 may be implemented as a computer server, and is configured to use a multi-layer token 250 (see FIG. 3) to effect a transfer from a payer account to a payee account. The payer account and the payee account may comprise any of a savings account, a chequing account, a credit account, a line of credit account and a loyalty points account.

The payer account may be maintained by the payor financial institution server 300*a*, and the payee account may be maintained by the payee financial institution server 300*b*. Alternately, the payer account and the payee account may be maintained by a common financial institution server 300. Independently of the number of financial institution servers 300 used to maintain the payer account and the payee account, the message processing server 400 acts as a trusted intermediary to the financial institution server(s) 300.

Communications Device

Figure 2:
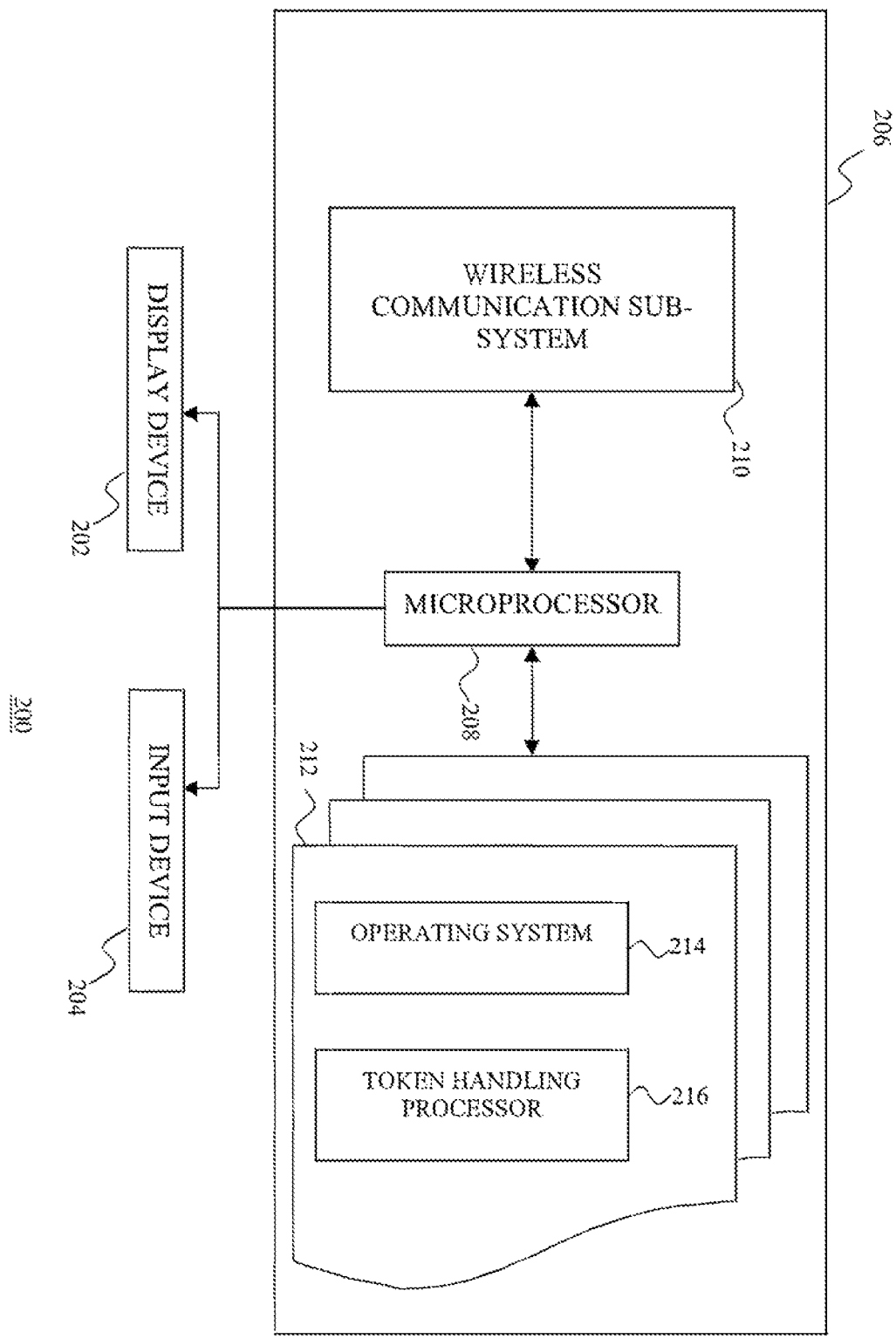
FIG. 2 is a schematic view of one of the communications devices.

A sample communications device 200 is depicted in FIG. 2. As shown, the mobile communications device 200 includes a display 202, user input device 204, and a data processing system 206. The user input device 204 may be provided as a keyboard, biometric input device (e.g. microphone) and/or a touch-sensitive layer provided on the display 202. The data processing system 206 comprises a microprocessor 208, a wireless communication sub-system 210 and a tangible non-transient computer-readable medium 212.

The communication sub-system 210 allows the mobile device 200 to communicate with the wireless network of the wide area network 120. As discussed, the wireless network may be configured as a WiFi network, a cellular network, or a combination thereof. Accordingly, the communication sub-system 210 allows the mobile device 200 to transmit and receive wireless communications signals over WiFi networks and/or cellular networks.

The computer-readable medium 212 typically comprises non-volatile electronic computer memory that stores computer processing instructions which, when accessed from the memory 212 and executed by the microprocessor 208, implement an operating system 214 and a token handling processor 216. The operating system 214 is configured to display output on the display 202, to receive user input from the input device 204, and to send and receive communication signals over the wireless network.

The operation of the token handling processor 216 will be discussed in greater detail below. However, it is sufficient at this point to note that the token handling processor 216 is configured to receive a multi-layer token 250 or a pointer to a multi-layer token 250 for a proposed high-value financial transaction, and to transmit the token (or pointer) to another communications device to effect a payment from a payer financial institution to a payee financial institution.

Multi-Layer Token

Figure 3:
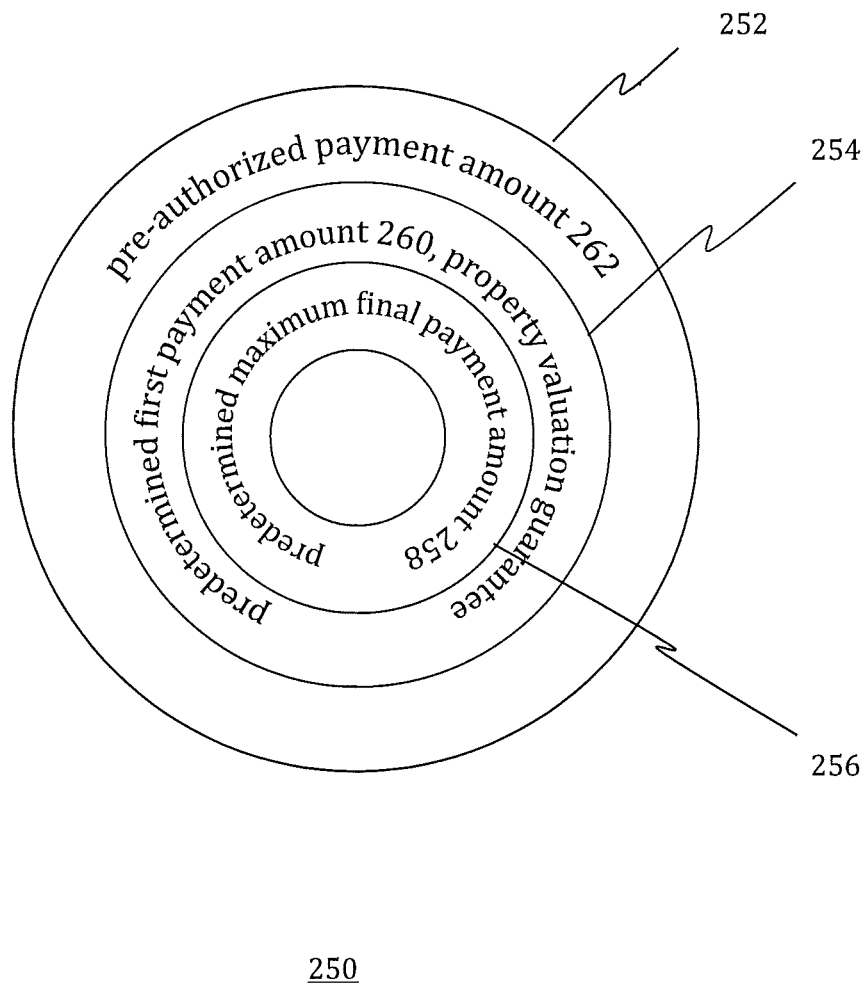
FIG. 3 is a logical representation of one of the multi-layer tokens.

As discussed, the communications device 200 and the message processing server 400 use a multi-layer token 250 to effect a transfer from a payer account to a payee account. As shown in FIG. 3, each multi-layer token 250 includes a plurality of data segments, configured in a hierarchical arrangement, such that each "parent" data segment includes at least one "child" data segment and any additional transaction data that may be required to effect a particular step of the transfer from the payer account to the payee account.

In the embodiment shown, the multi-layer token 250 comprises a hierarchical arrangement of encrypted data segments (encrypted data "layers"), for example a first encrypted data segment ("middle" data layer) 254, and a second encrypted data segment ("innermost" data layer) 256, and optionally also a primary encrypted data segment ("outermost" data layer) 252. In this implementation, the second encrypted data segment ("innermost" data layer) 256 includes a (second) data pointer to a database that stores a maximum data value (e.g. predetermined maximum final payment amount) 258. The second data pointer of the second encrypted data segment 256 may identify a payer financial institution, and a payer account that is maintained by the payer financial institution server 300*a* and has (or will have by the closing date of the financial transaction) an available balance equal to the maximum data value 258.

In the implementation depicted in FIG. 3, the first encrypted data segment ("middle" data layer) 254 includes the second encrypted data segment ("innermost" data layer) 256 and a (first) data pointer to a database that stores a second data value (e.g. predetermined first payment amount) 260. The first data pointer of the first encrypted data segment 254 may identify the second data value 260, a payer financial institution, and a payer account that is maintained by the payer financial institution server 300*a* and has an available balance equal to the second data value 260.

The payer financial institution identified by the first data pointer of the first encrypted data segment 254 is typically the same payer financial institution as that identified by the second data pointer of the second encrypted data segment 256. However, the multi-layer token 250 is not so limited; the first data pointer of the first encrypted data segment 254 may identify a payer financial institution that is different from the payer financial institution identified by the second data pointer of the second encrypted data segment 256.

In the implementation depicted in FIG. 3, the primary encrypted data segment ("outermost" data layer) 252 includes the first encrypted data segment ("middle" data layer) 254 and identifies a reference data value (e.g. pre-authorized payment amount) 262. The reference data value 262 is at least equal to the sum of the maximum data value 258 (specified by the second encrypted data segment 256)

and the second data value 260 (specified by the first encrypted data segment 254).

Since the first encrypted data segment ("middle" data layer) 254 includes the second encrypted data segment ("innermost" data layer) 256 and the first data pointer to a database storing the second data value 260, the primary encrypted data segment ("outermost" data layer) 252 therefore also includes the second encrypted data segment ("innermost" data layer) 256 and the first data pointer to the database storing the second data value 260.

Message Processing Server

Figure 4:
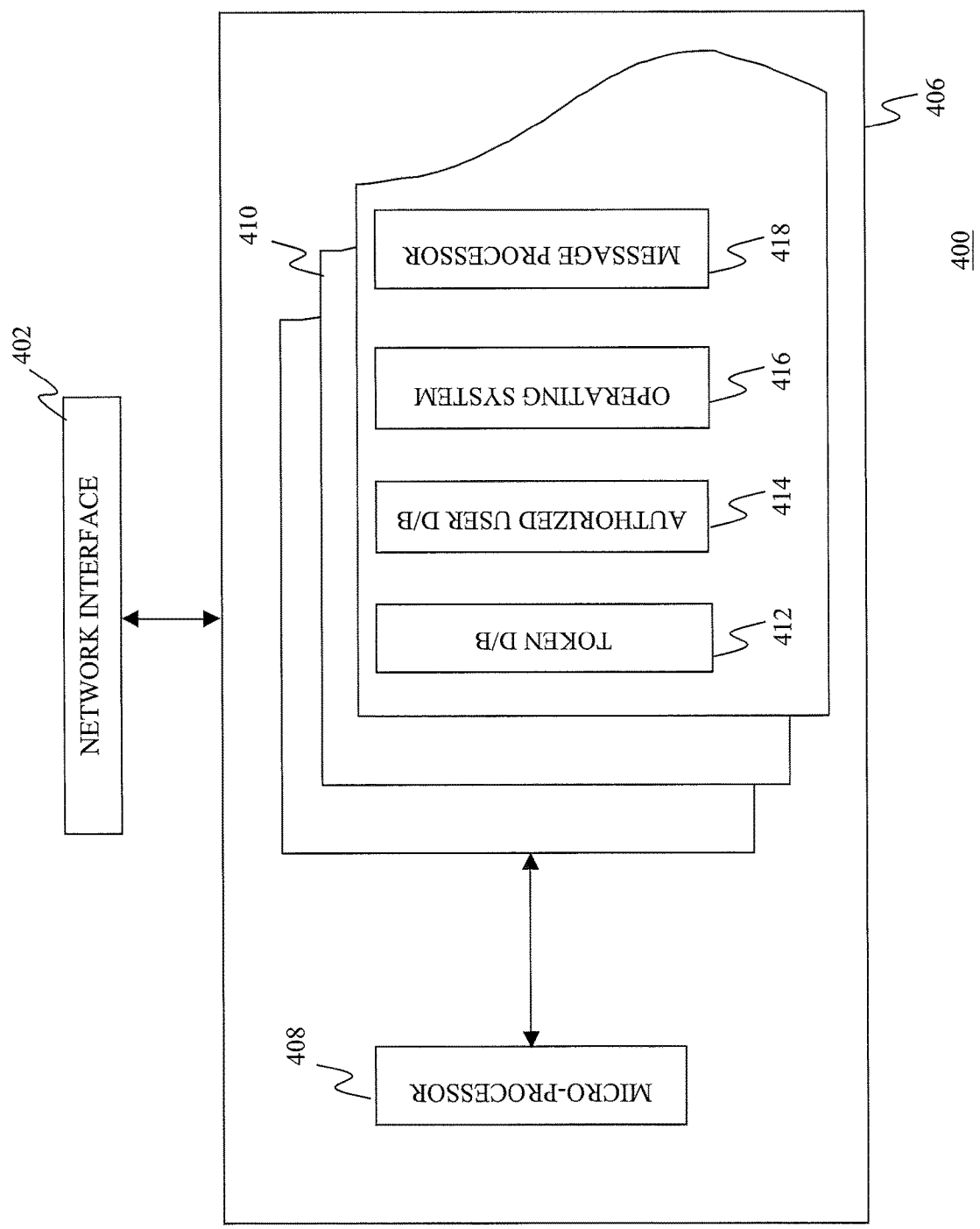
FIG. 4 is a schematic view of the message processing server.
Figure 5A:
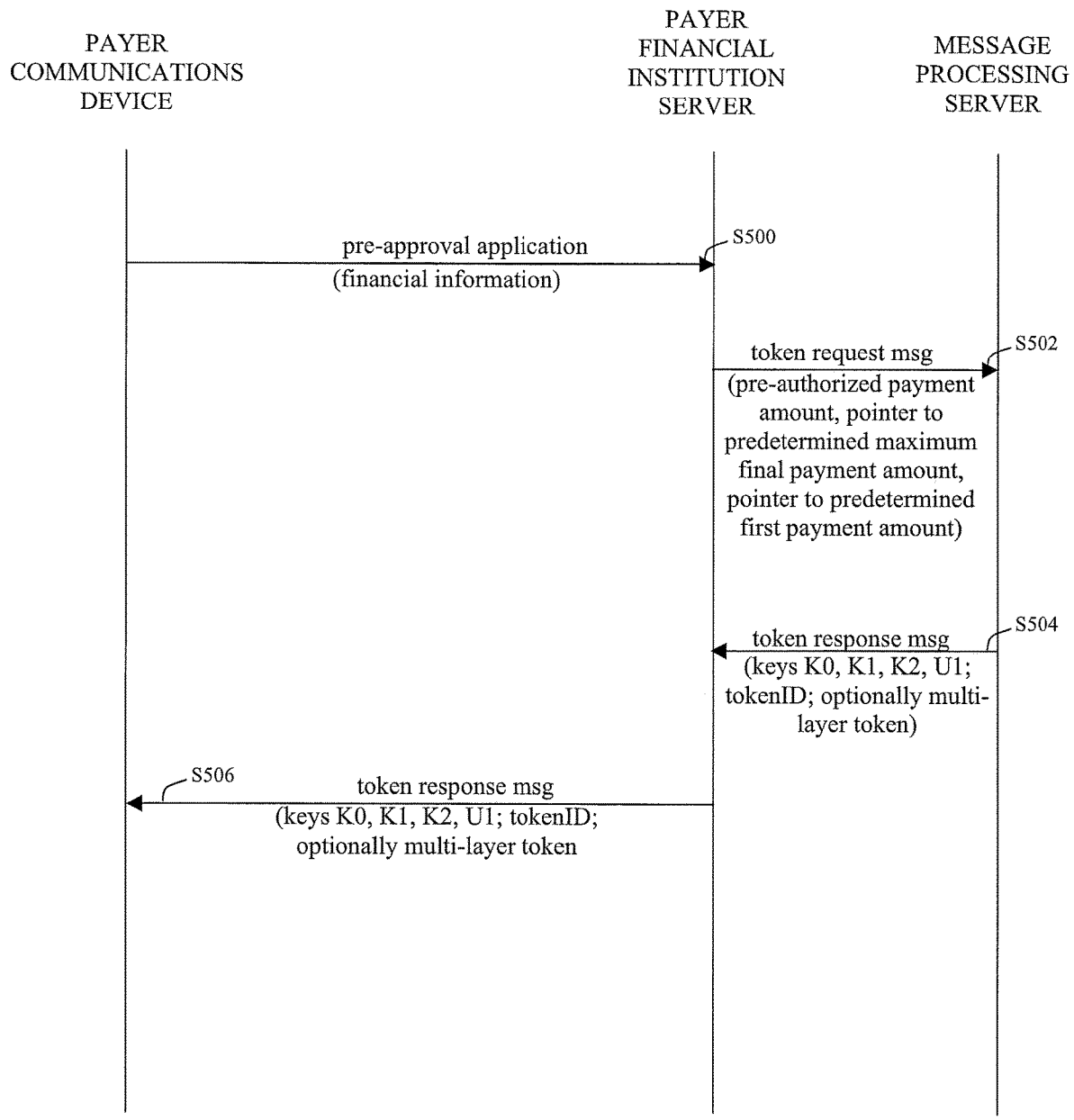
FIGS. 5a, 5b, 5c, 5d together comprise a message flow diagram depicting the method of validating encrypted data using one of the multi-layer tokens.
Figure 5B:
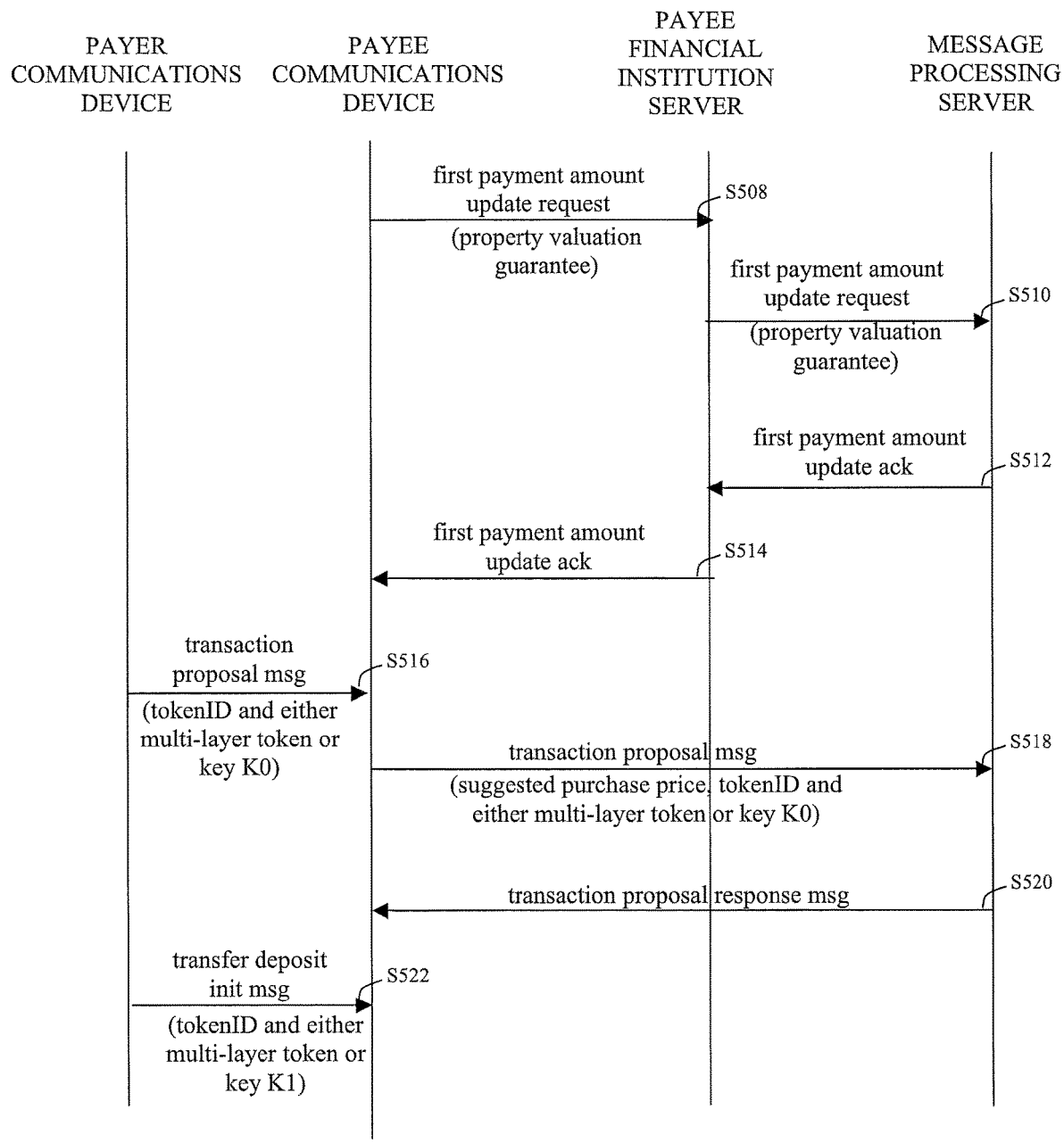
Figure 5C:
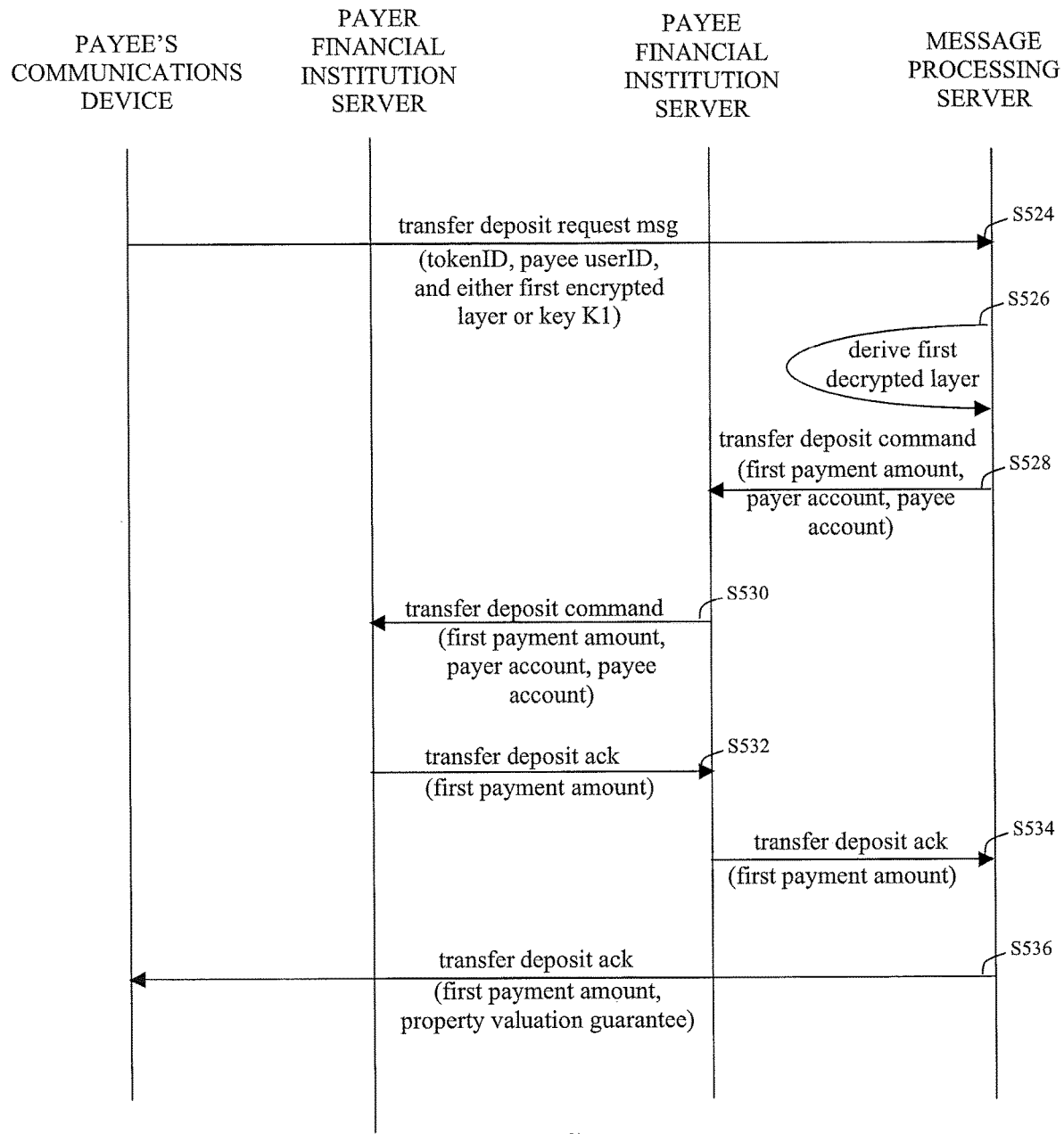
Figure 5D:
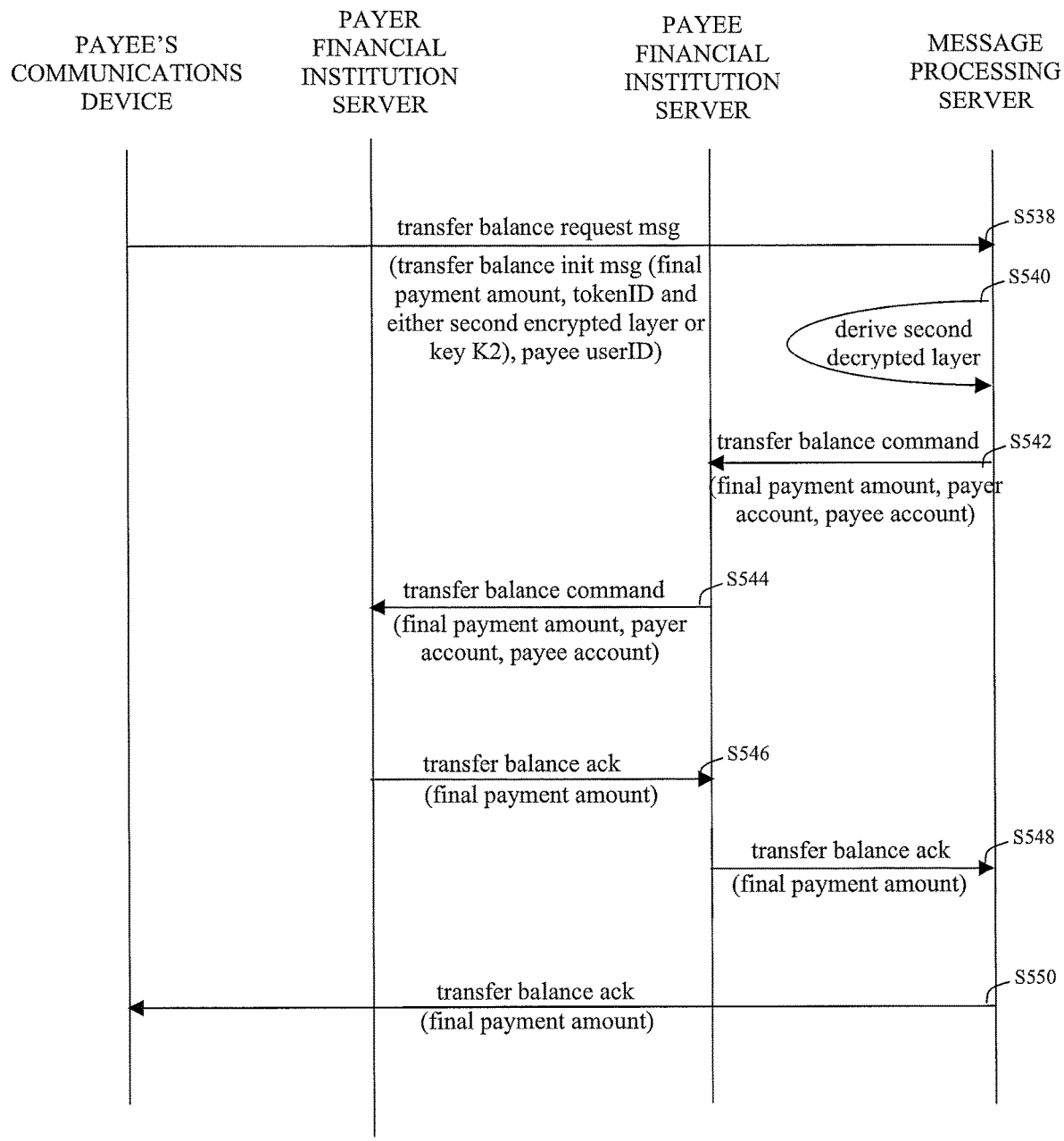

As shown in FIG. 4, the message processing server 400 includes a network interface 402, and a data processing system 406 that is coupled to the network interface 402. The network interface 402 interfaces the message processing server 400 with the financial institution server(s) 300 via the wide area network 120.

The data processing system 406 may include one or more microprocessors 408 and a tangible non-volatile computer-readable medium 410. The computer-readable medium 410 may be provided as electronic computer memory (e.g. flash memory) or optical or magnetic memory (e.g. compact disc, hard disk).

The computer-readable medium 410 may maintain a token database 412 and an authorized user database 414. The token database 412 includes groups of related database records. Each records group is uniquely associated with a respective multi-layer token 250, and typically stores a multi-layer token 250 and one or more associated cryptographic keys.

As discussed above, each multi-layer token 250 may include a second encrypted data segment 256, a first encrypted data segment 254, and optionally also a primary encrypted data segment 252. Each data segment 252, 254, 256 may be encrypted using a respective cryptographic key that is uniquely associated with the respective data segment. Accordingly, each records group of the token database 412 may include a master cryptographic key K0 associated with the primary encrypted data segment 252, a first cryptographic key K1 associated with the first encrypted data segment 254, and a second cryptographic key K2 associated with the second encrypted data segment 256.

Each cryptographic key K0, K1, K2 may be a symmetric cryptographic key that is used to generate and decrypt the associated data segment. Therefore, the master cryptographic key K0 may be used to generate and decrypt the primary encrypted data segment 252, the first cryptographic key K1 may be used to generate and decrypt the first encrypted data segment 254, and the second cryptographic key K2 may be used to generate and decrypt the second encrypted data segment 256.

Alternately, one or more of the cryptographic keys K0, K1, K2 may be a private cryptographic key of an asymmetric cryptographic key pair. Each private cryptographic key may be used to generate the associated data segment, and each corresponding public cryptographic key may be used to decrypt the associated data segment. Therefore, the master token private cryptographic key K0 may be used to generate the primary encrypted data segment 252, the first private cryptographic key K1 may be used to generate the first encrypted data segment 254, and the second private cryptographic key K2 may be used to generate the second encrypted data segment 256. A master public cryptographic key K0' may be used to decrypt the primary encrypted data segment 252, a first public cryptographic key K1' may be used to decrypt the first encrypted data segment 254, and a second public cryptographic key K2' may be used to decrypt the second encrypted data segment 256.

The authorized user database 414 includes groups of related database records. Each records group is uniquely associated with a respective registered user of the message processing network 100. Each records group typically identifies a unique user identifier userID for the registered user, and an account number of a financial account associated with the registered user. The user identifier userID stored in the authorized user database 414 may be the same as, or different from, the user identifier that the user uses to authenticate to the user's financial institution server 300. One or records groups may also include a private cryptographic key of an asymmetric cryptographic key pair that is associated with the registered user.

The non-transient computer-readable medium 410 also stores computer processing instructions which, when executed by the microprocessor(s) 408, define an operating system 416 that controls the overall operation of the message processing server 400. The computer processing instructions may also implement a message processor 418.

The message processor 418 is configured to (i) receive an authentication request identifying a first data value, and (ii) validate the authentication request from the first data value and the reference data value configured in one of the multi-layer tokens 250.

The message processor 418 is also configured to (iii) receive a first authorization message including a first cryptographic key K1, (iv) derive a first decrypted data layer from the first cryptographic key K1 and the first encrypted data layer (first encrypted data segment 254) of the multi-layer token 250, and (v) validate the first data pointer (of the first decrypted data layer) by receiving confirmation that the first data pointer points to a database entry that comprises the second data value 260 (which is less than the reference data value 262 of the primary encrypted data layer 252).

The first authorization message may identify a payee financial institution, and the message processor 418 may be configured to validate the first data pointer of the first decrypted data layer by transmitting to a computer server (e.g. payee financial institution server 300*b*) a funds transfer authorization including the first data pointer of the first decrypted data layer and authorizing a funds transfer from the payer financial institution to the payee financial institution in an amount of the second data value 260, and receiving from the computer server a confirmation of the funds transfer in the amount of the second data value.

The message processor 418 may also be configured to, subsequent to receiving the first authorization message, receive a second authorization message that includes a second cryptographic key K2 and a third data value, derive a second decrypted data layer from the second cryptographic key K2 and the second encrypted data layer (second encrypted data segment 256) of the first decrypted data layer of the one multi-layer token 250, and validate the second data pointer by receiving confirmation that the second data pointer points to a database entry that comprises the maximum data value 262 (which is not less than the third data value).

The message processor 418 may be configured to validate the second data pointer of the second decrypted data layer by transmitting to a computer server (e.g. payee financial institution server 300*b*) a funds transfer authorization authorizing a funds transfer from the payer financial institution to the payee financial institution in an amount of the third data value, and receiving from the computer server a confirmation of the funds transfer in the amount of the third data value.

In one example, the message processor 418 receives the authentication request from one of the communications devices 200, and is configured to provide the communications device 200 with the first token cryptographic key K1 via a communications channel that is distinct from the communications channel over which the message processor 418 receives the first authorization message. Further, the message processor 418 may be configured to decrypt the primary encrypted data layer (primary encrypted data segment 252) without exposing the reference data value 262 outside the message processor 418.

In one example, the message processor 418 is also configured to receive a valuation message that identifies an adjustment value (e.g. a property valuation guarantee identifying a monetary value), update the reference data value 262 with the adjustment value, and validate the authentication request from the first data value and the updated reference data value 262. The message processor 418 may update the reference data value 262 with the adjustment value by decrypting the primary encrypted data layer with the master cryptographic key K0, updating the reference data value 262 to include the adjustment value, and applying the master cryptographic key K0, the first encrypted data layer and the updated reference data value 262 as inputs to a cryptographic algorithm Although the message processor 418 is typically implemented as computer processing instructions, all or a portion of the message processor 418 may be implemented instead in electronics hardware, such as a field programmable logic gate array (FPGA) or a complex programmable logic device (CPLD).

Method of Validating Encrypted Data

As discussed, the message processing network 100 implements a method of validating encrypted data using a message processor 418 and a token database 412 of multi-layer tokens 250. A sample embodiment of the method will be discussed below, with reference to FIGS. 5a, 5b, 5c, 5d.

By way of overview, each multi-layer token 250 includes a plurality of encrypted data segments/layers. The first encrypted data segment/layer 254 includes a (first) data pointer to a database storing a second data value (e.g. the predetermined first payment amount) 260. The primary encrypted data segment/layer 252 includes the first encrypted data segment/layer 254 and identifies a reference data value (e.g. a pre-authorized payment amount) 262.

As will be explained, in this embodiment, the message processor 418 receives from a communications device 200 an authentication request that identifies a first data value (e.g. a proposed transaction amount), and validates the authentication request from the first data value and the reference data value 262 configured in one of the multi-layer tokens 250.

The message processor 418 also receives a first authorization message that includes a first cryptographic key K1, derives a first decrypted data layer from the first cryptographic key K1 and the first encrypted data layer of the one multi-layer token 250, and validates the first data pointer (of the first decrypted data layer) by receiving confirmation that the first data pointer points to a database entry that comprises the second data value 260 (which is less than the reference data value 262 of the primary encrypted data layer 252).

The first authorization message may identify a payee financial institution, and the message processor 418 may validate the first data pointer of the first decrypted data layer by (i) transmitting to a computer server (e.g. payee financial institution server 300b) a funds transfer authorization that includes the first data pointer of the first decrypted data layer and authorizes a funds transfer from the payer financial institution to the payee financial institution in an amount of the second data value (e.g. the predetermined first payment amount) 260, and (ii) receiving from the computer server a confirmation of the funds transfer in the amount of the second data value 260.

The first encrypted data segment/layer 254 includes the second encrypted data segment/layer 256, and the second encrypted data segment/layer 256 includes a (second) data pointer to a database storing the maximum data value (e.g. predetermined maximum final payment amount) 258. Subsequent to receiving the first authorization message, the message processor 418 may receive a second authorization message that includes a second cryptographic key K2 and a third data value, derive a second decrypted data layer from the second cryptographic key K2 and the second encrypted data segment/layer 256 of the first decrypted data layer of the one multi-layer token 250, and validate the second data pointer by receiving confirmation that the second data pointer points to a database entry that comprises the maximum data value 262 (which is not less than the third data value).

The message processor 418 may validate the second data pointer of the second decrypted data layer by (i) transmitting to a computer server (e.g. payee financial institution server 300b) a funds transfer authorization that authorizes a funds transfer from the payer financial institution to the payee financial institution in an amount of the third data value, and receives from the computer server a confirmation of the funds transfer in the amount of the third data value.

In one example, the message processor 418 provides the communications device 200 with the first token cryptographic key K1 via a communications channel that is distinct from the communications channel over which the message processor 418 receives the first authorization message. Further, the message processor 418 may decrypt the primary encrypted data layer (primary encrypted data segment 252) without exposing the reference data value 262 outside the message processor 418.

In one example, the message processor 418 also receives a valuation message that identifies an adjustment value (e.g. a property valuation guarantee identifying a monetary value), update the reference data value 262 with the adjustment value, and validates the authentication request from the first data value and the updated reference data value 262. The message processor 418 may update the reference data value 262 with the adjustment value by decrypting the primary encrypted data layer with the master cryptographic key K0, updating the reference data value 262 to include the adjustment value, and applying the master cryptographic key K0, the first encrypted data layer and the updated reference data value 262 as inputs to a cryptographic algorithm The authentication request may include the multi-layer token 250. The first authorization message may include the first encrypted data segment 254 (i.e. the multi-layer token 250 with the primary encrypted data segment 252 decrypted, but with the reference data value 262 removed/deleted). The second authorization message may include the second encrypted data segment 256 (i.e. the multi-layer token 250 with the primary encrypted data segment 252 and the first encrypted data segment 254 decrypted, but with the reference data value 262 and the first data pointer to the database storing the second data value 260 removed/deleted). Alternately, the authentication request, the first authorization message and/or the second authorization message may include a pointer to the multi-layer token 250 in the token database 412.

An example method of validating encrypted data will now be discussed in detail with reference to FIGS. 5a, 5b, 5c, 5d. The following method includes two phases: (1) a Token Generation Phase, and (2) a Token Redemption Phase. The foregoing phases are discussed below under their respective headings.

(1) Token Generation Phase

At the outset of the method, a registered user ("payer user") of the message processing network 100 may connect to the payer financial institution server 300a of the payer's financial institution via the payer's communications device 200a, and may use the payer's communications device 200 to authenticate to the payer financial institution server 300a by providing the payer financial institution server 300a with a user identifier and authentication code.

After the registered user authenticates to the payer financial institution server 300a, the payer user may use the payer communications device 200a to invoke a process running on the payer financial institution server 300a, initiating an application for pre-approval of a financial loan for a prospective high-value financial transaction (e.g. purchase of an automobile).

In response to the pre-approval application, the payer financial institution server 300a may request financial information from the payer user (e.g. payer's annual income and expenses, and the payer's assets, liabilities, and employment history). The payer user may provide the payer financial institution server 300a with the requested financial information, at step S500.

After considering the payer's financial information, and optionally various other financial indicators, such as current interest rates and the payer's credit history, the payer financial institution generates a predetermined maximum final payment amount 258 for the prospective high-value financial transaction. As will be explained, when the prospective high-value financial transaction closes, the message processing server 400 will command the payer financial institution to transfer to a payee financial institution an amount (the second payment amount) not exceeding the predetermined maximum final payment amount 258.

The payer may pledge liquid assets for the prospective high-value financial transaction. The value of these assets may comprise the predetermined first payment amount 260. As will be explained, after negotiation of the terms (e.g. proposed purchase price, predetermined first payment amount 260, second payment amount, closing date, closing conditions) for the high-value financial transaction have concluded, the message processing server 400 will command the payer financial institution to transfer the predetermined first payment amount 260 to the payee financial institution.

The payer financial institution also determines a pre-authorized payment amount 262 for the prospective high-value financial transaction. The pre-authorized payment amount 262 is typically equal to the sum of the predetermined maximum final payment amount 258 and the predetermined first payment amount 260. Therefore, the pre-authorized payment amount 262 is the maximum amount that the payer financial institution determines that the payer user can afford to spend for the prospective high-value financial transaction.

As a non-limiting example, the prospective high-value financial transaction may be a proposed automobile purchase, the payer user may have $1,000 cash in a bank account, and have been pre-approved by the payer financial institution for an automobile loan in the amount of $50,000. Therefore, the predetermined first payment amount 260, in this example, would be $1,000 and would be transferred to the payee as a deposit upon the payer and payee concluding negotiations for the automobile purchase.

The predetermined maximum final payment amount 258, in this example, would be $50,000. A second payment amount, up to the predetermined maximum final payment amount 258 ($50,000), would be transferred to the payee when the payee has satisfied the closing conditions and the payer accepts delivery of the automobile. The second payment amount will vary based on the purchase price negotiated for the automobile, but will not exceed the predetermined maximum final payment amount 258 ($50,000).

The pre-authorized payment amount 262, in this example, would be $51,000, which is the maximum amount that the payer user can spend on the automobile purchase. As will be explained, although the pre-authorized payment amount 262 is not disclosed to the payee user, the message processing server 400 will advise the payee user whether the payee's suggested purchase price (e.g. "sticker" price) exceeds the pre-authorized payment amount 262.

After determining the predetermined maximum final payment amount 258 and the predetermined first payment amount 260 for the prospective high-value financial transaction, the payer financial institution may deposit the predetermined maximum final payment amount 258 and the predetermined first payment amount 260 into one or more financial accounts maintained by the payer financial institution.

Alternately, since the predetermined maximum final payment amount 258 need not be paid until the financial transaction closes, the payer financial institution may defer depositing the predetermined maximum final payment amount 258 into an account until immediately prior to the transaction closing date.

The payer financial institution server 300a generates pointers to the account(s) for the predetermined maximum final payment amount 258 and the predetermined first payment amount 260. The pointers each identify the payer financial institution and the financial account(s) for the respective payment amounts 258, 260, and include any authorization codes that may be required for the message processing server 400 to initiate the transfer of the respective payment amounts 258, 260 to the payee financial institution.

At step S502, the payer financial institution server 300a generates a token request message that includes the pre-authorized payment amount 262, the pointer to the database storing the predetermined maximum final payment amount 258, and the pointer to the database storing the predetermined first payment amount 260, and transmits the token request message to the message processing server 400.

In response, the message processing server 400 generates a multi-layer token 250 from at least the token cryptographic keys K1, K2, the pre-authorized payment amount 262, the pointer to the database storing the predetermined maximum final payment amount 258, and the pointer to the database storing the predetermined first payment amount 260.

As discussed, In the embodiment shown in FIG. 3, the multi-layer token 250 includes a hierarchical arrangement of encrypted data segments/layers. For example, the multi-layer token 250 may include a primary encrypted data segment/layer 252, a first encrypted data segment/layer 254, and a second encrypted data segment/layer 256. Further, the token cryptographic keys K0, K1, K2 may each be uniquely associated with a respective one of the data segments/layers 252, 254, 256.

The second encrypted data segment/layer 256 includes the pointer to the database storing the predetermined maximum final payment amount 258. The message processing server 400 may generate the second encrypted data segment/layer 256 by applying the second token cryptographic key K2 and the pointer to the database storing the predetermined maximum final payment amount 258 as inputs to a cryptographic algorithm.

The first encrypted data segment/layer 254 includes the second encrypted data segment/layer 256 and the pointer to the database storing the predetermined first payment amount 260. The message processing server 400 may generate the first encrypted data segment/layer 254 by applying the first token cryptographic key K1, the second encrypted data segment/layer 256 and the pointer to the database storing the predetermined first payment amount 260 as inputs to a cryptographic algorithm.

The primary encrypted data segment/layer 252 includes the first encrypted data segment/layer 254 and the pre-authorized payment amount 262. Further, as will be explained, it may be advantageous to uniquely associate each multi-layer token 250 with the respective payer user. Therefore, the primary encrypted data segment/layer 252 may also include a token identifier tokenID that is uniquely associated with the payer user. The message processing server 400 may generate the primary encrypted data segment/layer 252 by applying the master token cryptographic key K0, the first encrypted data segment/layer 254 and the pre-authorized payment amount 262 (and optionally the token identifier tokenID) as inputs to a cryptographic algorithm.

After generating the primary encrypted data segment/layer 252, the first encrypted data segment/layer 254, and the second encrypted data segment/layer 256, the message processing server 400 may save the resulting multi-layer token 250 in the token database 412, in association with the token cryptographic keys K0, K1, K2 (and the token identifier tokenID) that were used to generate the encrypted data segment/layers 252, 254, 256.

Further, it may be advantageous to limit the likelihood of a token recipient making unauthorized use of a payer's multi-layer token 250. Therefore, the message processing server 400 may also save in the token database 412, in association with the multi-layer token 250, a user cryptographic key U1 that is associated with the payer user. The user cryptographic key U1 may be a symmetric cryptographic key, or a public cryptographic key of an asymmetric cryptographic key pair. As will be discussed below, a payer user may use the payer's user cryptographic key U1 (or a private cryptographic key associated with the payer's user (public) cryptographic key U1) to cryptographically-sign a transfer balance initiation message (that includes the second encrypted data segment/layer 256 and identifies the balancing owing on the financial transaction), and the message processing server 400 may be configured to validate the cryptographically-signed transfer balance initiation message with the user cryptographic key U1.

The message processing server 400 may generate the token cryptographic keys K0, K1, K2 (and optionally the token identifier tokenID and the user cryptographic key U1) by employing any suitable cryptographic technique known in the art, including generating each key/tokenID from a pseudo-random number generator or a noise generator. The message processing server 400 may confirm that each new token cryptographic key K0, K1, K2 is uniquely associated with the respective data segment 252, 254, 256 (and that each token identifier tokenID and user cryptographic key U1 is uniquely associated with the payer user) by querying the token database 412 with the key/tokenID, and saving the key/tokenID in the token database 412 only after confirming that the key/tokenID has not already been saved to the token database 412.

The message processing server 400 may generate the token cryptographic keys K0, K1, K2 (and the token identifier tokenID and the user cryptographic key U1) in response to the token request message received from the payer financial institution server 300a (step S502). Alternately, the token cryptographic keys K0, K1, K2 (and the token identifier tokenID and the user cryptographic key U1) may be generated and stored in the token database 412 prior to receipt of the token request message (step S502).

The message processing server 400 may generate a token response message that includes the token cryptographic keys K0, K1, K2, the token identifier tokenID, and optionally also includes the multi-layer token 250 (and the user cryptographic key U1, if generated).

At step S504, the message processing server 400 transmits the token response message to the payer financial institution server 300a. In response, the payer financial institution server 300a transmits the token response message to the payer's communications device 200, at step S506. The data processing system 206 may then save the contents of the token response message in the memory 212 of the payer's communications device 200a.

After the payer's communications device 200 receives the token response message for the prospective high-value financial transaction, the payer may wish to negotiate a high-value financial transaction with a registered user of the message processing network 100. However, the payer user may own personal property (e.g. one or more automobiles), which was not considered by the payer financial institution when the payer financial institution server 300a generated the multi-layer token 250. The payer user may wish to apply the current value of the personal property as partial payment (e.g. as a trade-in allowance) towards the purchase price in the prospective high-value financial transaction.

Although various resources (e.g. Black Book, Kelley Blue Book, Red Book, Edmunds.com, NADA (National Automobile Dealers Association) Guide) may exist for estimating the current value of a payer's personal property, the actual current value will depend on various factors, such as the physical condition and geographical location of the item of personal property, and the size of the market for the personal property or similar products. Therefore, the payer user may have the current value of the personal property determined by a professional property evaluator/reseller. In the current example where the item of personal property is an automobile, the payee user may attend at the premises of a pre-owned automobile reseller or a new automobile dealership for an assessment of the current value of the automobile.

The automobile reseller/dealership may determine the current value of the automobile using, for example, one or more of the foregoing resources. In one example, the automobile reseller/dealership is a registered user ("payee user") of the message processing network 100, and may connect to the payee financial institution server 300b of the payee's financial institution via the payee's communications device 200b, and may use the payee's communications device 200b to authenticate to the payee financial institution server 300b by providing the payee financial institution server 300b with a user identifier and authentication code.

After the payee user has authenticated to the payee financial institution server 300b, the payee user may use the payee communications device 200b to invoke a process running on the payee financial institution server 300b, initiating a predetermined first payment amount update request to the financial transaction pre-approval. In response to the predetermined first payment amount update request, the payee financial institution server 300b may request particulars of the personal property that the payer user wishes to apply towards the purchase price in the prospective high-value financial transaction.

In response, the payer user provides the payee user with the token identifier tokenID for the prospective high-value financial transaction. The payee user may input into the payee communications device 200b the token identifier tokenID and the current value of the payer's item of personal property, and optionally also a personal property identifier (e.g. Vehicle Identification Number) that uniquely identifies the item of personal property. The payee communications device 200b may then generate a property valuation guarantee message that includes the token identifier tokenID and the current value of the payer's item of personal property, and optionally also the personal property identifier.

As will be explained, by virtue of the property valuation guarantee, the payee user guarantees to other payee users the current value of the identified item of personal property. Therefore, a payee user that accepts the item of personal property as a trade-in allowance in a high-value financial transaction may use the property valuation guarantee to sell the item of personal property (at the value identified in the property valuation guarantee) to the payee user that generated the property valuation guarantee.

In an attempt to prevent the payee user that generated the property valuation guarantee from subsequently repudiating the guarantee, the property valuation guarantee may be digitally-signed by the payee user that generated the property valuation guarantee. Therefore, in one example, the payee communications device 200b is configured with a private cryptographic key and a corresponding public cryptographic key of an asymmetric cryptographic key pair associated with the payee user, and a public digital certificate, signed by a certificate authority, that includes the payee's public cryptographic key. Further, in one example, the payee communications device 200b digitally-signs the property valuation guarantee with the payee's private cryptographic key.

The payee communications device 200b includes the property valuation guarantee (and optionally also the payee's public digital certificate, if the property valuation guarantee was digitally-signed) in a predetermined first payment amount update command, and provides the payee financial institution server 300b with the predetermined first payment amount update request, at step S508. The payee financial institution server 300b transmits the predetermined first payment amount update request to the message processing server 400, at step S510.

As discussed, the value of the payer's liquid assets comprises the predetermined first payment amount 260 (specified by the first encrypted data segment 254). To account for the current value of the payer's item of personal property, the message processing server 400 uses the token identifier tokenID to locate the multi-layer token 250 in the token database 214, derives a primary decrypted data segment/layer by decrypting the primary encrypted data segment/layer 252 of the multi-layer token 250 using the master cryptographic key K0, extracts the first encrypted data segment/layer 254 from the primary decrypted data segment/layer, derives a first decrypted data segment/layer by decrypting the first encrypted data segment/layer 254 with the first token cryptographic key K1, and extracts the second encrypted data segment/layer 256 and the pointer to the database storing the predetermined first payment amount 260 from the first decrypted data segment/layer.

The message processing server 400 then re-generates the first encrypted data segment/layer 254 by applying the first token cryptographic key K1, the second encrypted data segment/layer 256, the pointer to the database storing the predetermined first payment amount 260, and the property valuation guarantee (and optionally also the payee's public digital certificate, if the property valuation guarantee was digitally-signed), as inputs to a cryptographic algorithm.

As discussed, the pre-authorized payment amount 262 is typically equal to the sum of the predetermined maximum final payment amount 258 (specified by the second encrypted data segment 256) and the predetermined first payment amount 260. To account for the current value of the payer's item of personal property, the message processing server 400 updates the pre-authorized payment amount 262 to include the current value of the payer's item of personal property, and then re-generates the primary encrypted data segment/layer 252 by applying the master token cryptographic key K0, the re-generated first encrypted data segment/layer 254 and the updated pre-authorized payment amount 262 (and optionally the token identifier tokenID) as inputs to a cryptographic algorithm.

Continuing from the foregoing example where the predetermined first payment amount 260 is $1,000, and the predetermined maximum final payment amount 258 is $50,000, the updated pre-authorized payment amount 262 would be $51,500 if the current value of the identified item of personal property was $500.

After re-generating the primary encrypted data segment/layer 252 and the first encrypted data segment/layer 254, the message processing server 400 saves the updated multi-layer token 250 in the token database 412, in association with the token cryptographic keys K0, K1, K2 (and the token identifier tokenID). The message processing server 400 may generate a predetermined first payment amount update acknowledgement message, and may transmit the predetermined first payment amount update acknowledgement message to the payee financial institution server 300b, at step S512. In response, the payee financial institution server 300b may transmit the predetermined first payment amount update acknowledgement message to the payee's communications device 200b, at step S514.

As will be apparent, the multi-layer token 250 may have been downloaded to the payer's communications device 200a, at step S504, prior to the payee user initiating a predetermined first payment amount update request. To update the multi-layer token 250 on the payer's communications device 200a after the message processing server 400 saves the updated multi-layer token 250 in the token database 412, the payer user may use the payer communications device 200a to invoke a process running on the payer financial institution server 300a, initiating a token update request.

In response to the token update request, the payer financial institution server 300a may request the token identifier tokenID from the payer user. The payer user may provide the payer financial institution server 300a with the token identifier tokenID, and the payer financial institution server 300a may generate a token download request message that includes the token identifier tokenID, and transmit the token download request message to the message processing server 400. In response, the message processing server 400 uses the token identifier tokenID to locate the multi-layer token 250 in the token database 214, generates a token download response message that includes the token identifier tokenID and the updated multi-layer token 250, and transmits the token download response message to the payer financial institution server 300a. In response, the payer financial institution server 300a transmits the token download response message to the payer's communications device 200a.

The financial information of the payer user (e.g. payer's annual income and expenses, and the payer's assets, liabilities, and employment history) may have changed after the multi-layer token 250 was downloaded to the payer's communications device 200a, at step S504. In this situation, the payer user may also use the payer's communications device 200a to invoke a process running on the payer financial institution server 300a, initiating a pre-approval application update to the financial transaction pre-approval.

In response to the pre-approval application update, the payer financial institution server 300a may request the updated financial information from the payer user, and the payer user may provide the payer financial institution server 300a with the token identifier tokenID and the requested updated financial information. The payer financial institution server 300a may update the predetermined first payment amount 260, and/or the predetermined maximum final payment amount 258 based on the updated financial information, and may generate a token update request message that includes the token identifier tokenID, the pointer to the database storing the updated predetermined maximum final payment amount 258, and the pointer to the database storing the updated predetermined first payment amount 260.

The payer financial institution server 300a transmits the token update request message to the message processing server 400. In response, the message processing server 400 uses the token identifier tokenID to locate the multi-layer token 250 in the token database 214, derives a primary decrypted data segment/layer by decrypting the primary encrypted data segment/layer 252 of the multi-layer token 250 using the master cryptographic key K0, extracts the first encrypted data segment/layer 254 from the primary decrypted data segment/layer, and derives a first decrypted data segment/layer by decrypting the first encrypted data segment/layer 254 with the first token cryptographic key K1.

The message processing server 400 then re-generates the second encrypted data segment/layer 256 by applying the second token cryptographic key K2 and the pointer to the database storing the updated predetermined maximum final payment amount 258 as inputs to a cryptographic algorithm. The message processing server 400 re-generates the first encrypted data segment/layer 254 by applying the first token cryptographic key K1, the re-generated second encrypted data segment/layer 256, the pointer to the database storing the updated predetermined first payment amount 260, and the property valuation guarantee (and optionally also the payee's public digital certificate, if the property valuation guarantee was digitally-signed), as inputs to a cryptographic algorithm.

The message processing server 400 updates the pre-authorized payment amount 262 based on the current value of the payer's item of personal property, the updated predetermined first payment amount 260 and the updated predetermined maximum final payment amount 258. The message processing server 400 regenerates the primary encrypted data segment/layer 252 by applying the master token cryptographic key K0, the re-generated first encrypted data segment/layer 254 and the updated pre-authorized payment amount 262 (and optionally the token identifier tokenID) as inputs to a cryptographic algorithm.

After re-generating the primary encrypted data segment/layer 252 and the first encrypted data segment/layer 254, the message processing server 400 saves the updated multi-layer token 250 in the token database 412, in association with the token cryptographic keys K0, K1, K2 (and the token identifier tokenID), as described above. The message processing server 400 may generate a token update response message that includes the token identifier tokenID and optionally may also include the updated multi-layer token 250, and transmits the token update response message to the payer financial institution server 300a. In response, the payer financial institution server 300a transmits the token update response message to the payer's communications device 200a.

(2) Token Redemption Phase

After the payer's communications device 200 receives the token (update) response message or the token download response for the prospective high-value financial transaction, the payer user may wish to negotiate the terms (e.g. purchase price, predetermined first payment amount 260, second payment amount, closing date, closing conditions) of a high-value financial transaction with a payee user of the message processing network 100. This payee user may be the same payee user that provided the property valuation guarantee, or a different payee user.

Before negotiating the terms of the high-value financial transaction, the payee user might prefer that the payer user first demonstrate that the payer has sufficient financial resources to complete the financial transaction. However, the payer user might not want to reveal to the payee user particulars of the payer's financial resources, such as the payer's pre-authorized payment amount 262.

To address this potential impasse, the payer user may invoke the token handling processor 216 on the payer's communications device 200a. In response, the token handling processor 216 may generate a transaction initiation message that includes the token identifier tokenID and either the multi-layer token 250 or the master token cryptographic key K0. The payer user may use the input device 204 on the payer's communications device 200a to input the payer's user identifier userID, and the token handling processor 216 may incorporate the user identifier userID into the transaction initiation message.

At step S516, the payor's communications device 200a transmits the transaction initiation message to the payee's communications device 200b. As non-limiting examples, the token handling processor 216 of the payor's communications device 200a may wirelessly transmit the transaction initiation message to the payee's communications device 200b directly (for example via Bluetooth or NFC) or indirectly (for example via WiFi or cellular communications) by e-mail or a relay and proximity service, for example the relay service provided by Bump Technologies.

Upon receipt of the transaction initiation message, the payee user may invoke the token handling processor 216 on the payee's communications device 200b and use the input device 204 thereof to input the payee's suggested purchase price (e.g. the automobile "sticker" price) to the token handling processor 216. In response, the token handling processor 216 may generate a transaction proposal message that identifies the suggested purchase price and includes the token identifier tokenID and either the multi-layer token 250 or the master token cryptographic key K0. The transaction proposal message may also include the payer's user identifier userID, if provided. At step S518, the payee user may use the payee's communications device 200b to transmit the transaction proposal message to the message processing server 400 for confirmation that the payer has sufficient financial resources to complete the financial transaction.

Continuing from the foregoing example where the predetermined first payment amount 260 is $1,000, the current value of the identified item of personal property is $500, and the predetermined maximum final payment amount 258 is $50,000, the second payment amount would be $47,500 if the payee's suggested purchase price was $49,000. Since the second payment amount cannot exceed the predetermined maximum final payment amount 258 ($50,000), the payee's suggested purchase price cannot exceed the pre-authorized payment amount 262 ($51,500).

If the transaction proposal message includes the multi-layer token 250, the message processor 418 of the message processing server 400 may validate the transaction proposal message by confirming that the multi-layer token 250 is uniquely associated with the payer user. If the transaction proposal message includes the multi-layer token 250, the message processor 418 may locate the master cryptographic key K0 that is associated with the token identifier tokenID in the token database 412, derive a primary decrypted data segment/layer by decrypting the primary encrypted data segment/layer 252 of the multi-layer token 250 using the located master cryptographic key K0, and validate the transaction proposal message by comparing the token identifier tokenID included in the primary decrypted data segment/layer with the token identifier tokenID included in the transaction proposal message.

Alternately, if the transaction proposal message includes the master cryptographic key K0, the message processor 418 may locate the multi-layer token 250 in the token database 412 using the token identifier tokenID included in the transaction proposal message, derive a primary decrypted data segment/layer by decrypting the primary encrypted data segment/layer 252 of the located multi-layer token 250 using the master cryptographic key K0, read the token identifier tokenID from the primary decrypted data segment/layer, and validate the transaction proposal message by comparing the token identifier tokenID included in the primary decrypted data segment/layer with the token identifier tokenID included in the transaction proposal message.

If the message processor 418 successfully confirms that the multi-layer token 250 is uniquely associated with the payer user, the message processor 418 has thereby confirmed that the payer user did not attempt to close the proposed financial transaction by providing the payee user with the multi-layer token 250 of another registered user of the message processing network 100.

After the message processor 418 successfully validates the transaction proposal message (if desired), the message processor 418 validates the transaction proposal from the proposed transaction amount and the pre-authorized payment amount 262 configured in the multi-layer token 250. The message processor 418 may validate the transaction proposal by reading the pre-authorized payment amount 262 (e.g. $51,500) from the primary decrypted data segment/layer, and comparing the pre-authorized payment amount 262 against the payee's proposed transaction amount (e.g. $49,000) specified in the transaction proposal message.

Alternately (or additionally), the message processing server 400 may request from the payer financial institution server 300a a real-time update to the pre-authorized payment amount 262, and validate the transaction proposal by comparing the updated pre-authorized payment amount 262 against the proposed transaction amount specified in the transaction proposal message. Therefore, the message processor 418 may query the authorized user database 414 with the payer's user identifier userID (if provided) to locate the financial account information that is associated with the payer user in the authorized user database 414, and then generate a pre-approval application update request that includes the located financial account information and the token identifier tokenID. If the payer's user identifier userID is the same user identifier that the payer user uses to authenticate to the payer financial institution server 300a, the message processor 418 may instead include the user identifier userID and the token identifier tokenID in the pre-approval application update request. The message processor 418 may then transmit the pre-approval application update request to the payer financial institution server 300a to determine whether the payer user's financial position has changed since the date that the multi-layer token 250 was generated.

The payer financial institution server 300a may use the financial account information or the user identifier userID, included in the pre-approval application update request, to identify the payer user. After re-considering the payer's financial information, and optionally various other financial indicators, such as current interest rates and the payer's current credit history, the payer financial institution may update the predetermined maximum final payment amount 258 and the pre-authorized payment amount 262, and generate a token update request message that includes the token identifier tokenID, the updated pre-authorized payment amount 262, the pointer to the database storing the updated predetermined maximum final payment amount 258, and the pointer to the database storing the predetermined first payment amount 260.

The payer financial institution server 300a may transmit the token update request message to the message processing server 400, and the message processing server 400 may generate an updated multi-layer token 250 and save the updated multi-layer token 250 in the token database 412 in association with the token identifier tokenID, as described above. The message processor 418 may validate the transaction proposal by comparing the pre-authorized payment amount 262 configured in the updated multi-layer token 250 against the proposed transaction amount specified in the transaction proposal message.

If the message processor 418 determines that the pre-authorized payment amount 262 (e.g. $51,500) is at least equal to the proposed transaction amount (e.g. $49,000), the message processor 418 has validated the transaction proposal and has thereby confirmed that the payer has sufficient financial resources to complete the financial transaction. The message processor 418 may save the first encrypted data segment/layer 254 in the token database 412 in association with the tokenID.

The message processor 418 generates a transaction proposal response message that confirms that the payer has sufficient financial resources to complete the financial transaction, and transmits the transaction proposal response message to the payee's communications device 200b, at step S520.

After the payer and payee have negotiated the terms (e.g. actual purchase price, predetermined first payment amount 260, second payment amount, closing date, closing conditions) for the high-value financial transaction, the payer user may use the payer communications device 200a to invoke a process running on the payer financial institution server 300a, initiating a token update request.

In response to the token update request, the payer financial institution server 300a may request the token identifier tokenID from the payer user. The payer user may provide the payer financial institution server 300a with the token identifier tokenID, and the payer financial institution server 300a may generate a token download request message that includes the token identifier tokenID, and transmit the token download request message to the message processing server 400. In response, the message processing server 400 may use the token identifier tokenID to locate the first encrypted data segment/layer 254 in the token database 214, generate a token download response message that includes the token identifier tokenID and the first encrypted data segment/layer 254, and transmit the token download response message to the payer financial institution server 300a. In response, the payer financial institution server 300a may transmit the token download response message to the payer's communications device 200a.

The payer user may then invoke the token handling processor 216 on the payer's communications device 200a, to initiate a transfer of the first encrypted data segment/layer 254 or the first token cryptographic key K1 to the payee. In response, the token handling processor 216 generates a transfer deposit initiation message that includes the token identifier tokenID and either the first encrypted data segment/layer 254 or the first token cryptographic key K1.

At step S522, the payor's communications device 200a transmits the transfer deposit initiation message to the payee's communications device 200b. As non-limiting examples, the token handling processor 216 of the payor's communications device 200a may wirelessly transmit the transfer deposit initiation message to the payee's communications device 200b directly (for example via Bluetooth or NFC) or indirectly (for example via WiFi or cellular communications) by e-mail or a relay and proximity service, for example the relay service provided by Bump Technologies.

Upon receipt of the transfer deposit initiation message, the payee user may invoke the token handling processor 216 on the payee's communications device 200b to thereby effect a transfer of the predetermined first payment amount 260 (e.g. $1,000) to the payee financial institution. As discussed, the first encrypted data segment/layer 254 includes a pointer to a database storing the predetermined first payment amount 260, and may also include a (signed) property valuation guarantee (and optionally also the associated public digital certificate).

In response, the token handling processor 216 may generate a transfer deposit request message that includes the token identifier tokenID and either the first encrypted data segment/layer 254 or the first token cryptographic key K1. The payee may use the input device 204 to input the payee's userID to the token handling processor 216 and, therefore, the transfer deposit request message may also include the payee's userID.

At step S524, the payee's communications device 200b transmits the transfer deposit request message to the message processing server 400 to initiate the transfer of the predetermined first payment amount 260 (e.g. $1,000) from the payer financial institution to the payee financial institution. As will be apparent, the message processing server 400 receives the transfer deposit request message over a communications channel that is distinct from the communications channel over which the message processing server 400 provides the first token cryptographic key K1 to the payer communications device 200a (steps S504, S506).

The message processor 418 may validate the transfer deposit request message by verifying that the authorized user database 414 includes a records group associated with the payee's userID. If the message processor 418 successfully confirms that the authorized user database 414 includes a records group associated with the payee's userID, the message processor 418 has thereby confirmed that the transfer deposit request message was generated by a registered user of the message processing network 100.

After the message processor 418 successfully validates the transfer deposit request message, the message processor 418 derives a first decrypted data layer by decrypting the first encrypted data segment/layer 254 with the first token cryptographic key K1.

If the transfer deposit request message includes the first encrypted data segment/layer 254, the message processor 418 may locate the first token cryptographic key K1 that is associated with the token identifier tokenID in the token database 412, and decrypt the first encrypted data segment/layer 254 using the located first token cryptographic key K1. Alternately, if the transfer deposit request message includes the first token cryptographic key K1, the message processor 418 may locate the first encrypted data segment/layer 254 that is associated with the token identifier tokenID in the token database 412, and decrypt the located first encrypted data segment/layer 254 using the first token cryptographic key K1.

After the message processor 418 derives the first decrypted data layer from the first encrypted data segment/layer 254, at step S526 the message processor 418 may extract the second encrypted data segment/layer 256 from the first decrypted data layer, and save the second encrypted data segment/layer 256 in the token database 412 in association with the tokenID.

The message processor 418 then uses the pointer to the financial account of the predetermined first payment amount 260 at the payer financial institution to effect a transfer of the predetermined first payment amount 260 (e.g. $1,000) from the payer financial institution to the payee financial institution. The message processor 418 extracts from the first decrypted data segment the pointer to the financial account at the payer financial institution that holds the predetermined first payment amount 260.

From the financial account information of the records group associated with the payee's userID in the authorized user database 414, the message processor 418 determines the financial account at the payee financial institution into which the predetermined first payment amount 260 (e.g. $1,000) should be deposited. The message processor 418 then generates a transfer deposit command that includes the financial account information at the payee financial institution and the pointer to the financial account of the predetermined first payment amount 260 at the payer financial institution.

At step S528, the message processing server 400 transmits the transfer deposit command to the payee financial institution server 300b. In response, the payee financial institution server 300b determines the payer's financial institution from the pointer included in the transfer deposit command, and redirects the transfer deposit command to the payer financial institution server 300a, at step S530.

Upon receipt of the transfer deposit command, the payer financial institution server 300a determines the payer financial account and the predetermined first payment amount 260 from the pointer included in the transfer deposit command. The payer financial institution server 300a determines the payee financial account from the financial account information included in the transfer deposit command. The payer financial institution server 300a then initiates a funds transfer of the predetermined first payment amount 260 (e.g. $1,000) from the determined payer financial account to the determined payee financial account. At step S532, the payer financial institution server 300a responds to the transfer deposit command by transmitting to the payee financial institution server 300b a transfer deposit acknowledgment message that confirms the transfer of the predetermined first payment amount 260 to the payee financial account.

The payee financial institution server 300b provides the message processing server 400 with the transfer deposit acknowledgment message, in response to the transfer deposit command, at step S534. The message processing server 400 incorporates the property valuation guarantee (and optionally also the payee's public digital certificate) in the transfer deposit acknowledgment message, and transmits the transfer deposit acknowledgment message to the payee's communications device 200b, in response to the transfer deposit request message, at step S536.

Since the (signed) property valuation guarantee guarantees the value of the identified item of personal property (e.g. $500), the payee user that receives the transfer deposit acknowledgment message may use the property valuation guarantee to sell the item of personal property (at the value identified in the property valuation guarantee) to the payee user that generated the property valuation guarantee.

After the payee user that received the transfer deposit acknowledgment message satisfies the remaining terms (e.g. closing date, closing conditions) of the high-value financial transaction, the payer user may use the payer communications device 200a to invoke a process running on the payer financial institution server 300a, initiating a token update request.

In response to the token update request, the payer financial institution server 300a may request the token identifier tokenID from the payer user. The payer user may provide the payer financial institution server 300a with the token identifier tokenID, and the payer financial institution server 300a may generate a token download request message that includes the token identifier tokenID, and transmit the token download request message to the message processing server 400. In response, the message processing server 400 may use the token identifier tokenID to locate the second encrypted data segment/layer 256 in the token database 214, generate a token download response message that includes the token identifier tokenID and the second encrypted data segment/layer 256, and transmit the token download response message to the payer financial institution server 300a. In response, the payer financial institution server 300a may transmit the token download response message to the payer's communications device 200a.

The payer user may then invoke the token handling processor 216 on the payer's communications device 200a, and use the input device 204 thereof to input the balancing owing on the financial transaction (second payment amount) to the token handling processor 216. As discussed, the second encrypted data segment/layer 256 includes a pointer to the predetermined maximum final payment amount 258 ($50,000), and the second payment amount ($47,500) does not exceed the predetermined maximum final payment amount 258.

In response, the token handling processor 216 generates a transfer balance initiation message that identifies the second payment amount and includes the token identifier tokenID, and either the second encrypted data segment/layer 256 or the second token cryptographic key K2. In one example, the token handling processor 216 cryptographically signs the transfer balance initiation message with the user cryptographic key U1.

The payor's communications device 200a then transmits the transfer balance initiation message to the payee's communications device 200b, to initiate a transfer of the second payment amount (e.g. $47,500) from the payer financial institution to the payee financial institution. As non-limiting examples, the token handling processor 216 of the payor's communications device 200a may wirelessly transmit the transfer balance initiation message to the payee's communications device 200b directly (for example via Bluetooth or NFC) or indirectly (for example via WiFi or cellular communications) by e-mail or a relay and proximity service, for example the relay service provided by Bump Technologies.

The payee user may invoke the token handling processor 216 on the payee's communications device 200b to initiate a transfer of the second encrypted data segment/layer 256 or the second token cryptographic key K2 to the message processing server 400. In response, the token handling processor 216 generates a transfer balance request message that includes the (signed) transfer balance initiation message. The payee may use the input device 204 to input the payee's userID to the token handling processor 216 and, therefore, the transfer balance request message may also include the payee's userID.

At step S538, the payee's communications device 200b transmits the transfer balance request message to the message processing server 400. As will be apparent, the message processing server 400 receives the transfer balance request message over a communications channel that is distinct from the communications channel over which the message processing server 400 provides the first token cryptographic key K1 to the payer communications device 200a (steps S504, S506).

If the transfer balance initiation message was cryptographically signed, the message processor 418 of the message processing server 400 may validate the transfer balance initiation message using the user cryptographic key U1 associated with the originator of the transfer balance initiation message. The message processor 418 may query the token database 412 with the token identifier tokenID to locate the user cryptographic key U1 associated with the token identifier tokenID, and use the located user cryptographic key U1 to validate the digital signature of the transaction proposal message.

If the message processor 418 successfully validates the cryptographically-signed transfer balance initiation message, the message processor 418 has thereby confirmed that the payer user created the transfer balance initiation message (i.e. the payee user did not alter the second payment amount (e.g. $47,500), for example, prior to sending the transfer balance request message to the message processing server 400).

The message processor 418 may further validate the transfer balance request message by verifying that the authorized user database 414 includes a records group associated with the payee's userID. If the message processor 418 successfully confirms that the authorized user database 414 includes a records group associated with the payee's userID, the message processor 418 has thereby confirmed that the transfer balance request message was generated by a registered user of the message processing network 100.

After the message processor 418 successfully validates the transfer balance request message, at step S540 the message processor 418 derives a second decrypted data layer by decrypting the second encrypted data segment/layer 256 with the second token cryptographic key K2.

If the transfer balance request message includes the second encrypted data segment/layer 256, the message processor 418 may locate the second token cryptographic key K2 that is associated with the token identifier tokenID in the token database 412, and decrypt the second encrypted data segment/layer 256 using the located second token cryptographic key K2. Alternately, if the transfer deposit request message includes the second token cryptographic key K2, the message processor 418 may locate the second encrypted data segment/layer 256 that is associated with the token identifier tokenID in the token database 412, and decrypt the located second encrypted data segment/layer 256 using the second token cryptographic key K2.

After the message processor 418 derives the second decrypted data layer from the second encrypted data segment/layer 256, the message processor 418 reads the second (final) payment amount (e.g. $47,500) from the transfer balance request message, and uses the pointer to the financial account of the predetermined maximum final payment amount 258 at the payer financial institution to effect a transfer of the second (final) payment amount from the payer financial institution to the payee financial institution. The message processor 418 extracts from the second decrypted data segment the pointer to the financial account at the payer financial institution that holds the predetermined maximum final payment amount 258.

From the financial account information associated with the tokenID in the token database 412, the message processor 418 determines the financial account at the payee financial institution into which the second (final) payment amount (e.g. $47,500) should be deposited. The message processor 418 then generates a transfer balance command that identifies second (final) payment amount and includes the token identifier tokenID and the authorized financial account information at the payee financial institution and the pointer to the financial account of the predetermined maximum final payment amount 258 at the payer financial institution.

At step S542, the message processing server 400 transmits the transfer balance command to the payee financial institution server 300b. In response, the payee financial institution server 300b determines the payer's financial institution from the pointer included in the transfer balance command, and redirects the transfer balance command to the payer financial institution server 300a, at step S544.

Upon receipt of the transfer balance command, the payer financial institution server 300a determines the second payment amount from the transfer balance command, and determines the payer financial account from the pointer included in the transfer deposit command. The payer financial institution server 300a determines the payee financial account from the financial account information included in the transfer deposit command. The payer financial institution server 300a then initiates a funds transfer of the second payment amount (e.g. $47,500) from the determined payer financial account to the determined payee financial account. At step S546, the payer financial institution server 300a may respond to the transfer balance command by transmitting to the payee financial institution server 300b a transfer balance acknowledgment message that includes the token identifier tokenID and confirms the transfer of the second payment amount to the payee financial account.

The payee financial institution server 300b provides the message processing server 400 with the transfer balance acknowledgment message, in response to the transfer deposit command, at step S548.

The message processing server 400 removes from the token database 214 the cryptographic keys K0, K1, K2, U1 and associated data stored in the token database 214 in association with the token identifier tokenID, and may transmit the transfer balance acknowledgment message to the payee's communications device 200b, in response to the transfer deposit request message, at step S550.

The invention claimed is:

1. A message processing server comprising:
a memory storing a token database of multi-layer tokens, each said multi-layer token including a plurality of encrypted data layers, a first of the encrypted data layers including a first data pointer, another of the encrypted data layers including the first encrypted data layer and identifying a reference data value; and
a message processor coupled to the memory and configured to:
receive, from a communications device, an authentication request identifying a first data value;
validate the authentication request by (i) deriving one decrypted data layer by decrypting the another encrypted data layer of one of the multi-layer tokens, and (ii) confirming that the first data value is not greater than the reference data value configured in the one decrypted data layer;
receive, from the communications device, a first authorization message including a first cryptographic key;
derive a first decrypted data layer by decrypting, with the first cryptographic key, the first encrypted data layer of the one decrypted data layer; and
validate the first data pointer of the first decrypted data layer by confirming the first data pointer pointing to a database entry comprising a second data value, wherein the second data value is less than the reference data value.

2. The message processing server according to claim 1, wherein the message processor is configured to receive a valuation message identifying an adjustment value, update the reference data value with the adjustment value, and validate the authentication request from the first data value and the updated reference data value.

3. The message processing server according to claim 2, wherein the message processor is configured to update the reference data value with the adjustment value by decrypting the another encrypted data layer with a master cryptographic key, updating the reference data value to include the adjustment value, and applying the master cryptographic key, the first encrypted data layer and the updated reference data value as inputs to a cryptographic algorithm.

4. The message processing server according to claim 3, wherein the message processor is configured to incorporate the adjustment value into the first encrypted data layer of the one multi-layer token.

5. The message processing server according to claim 1, wherein the message processor is configured to provide the communications device with the first cryptographic key via a communications channel distinct from a communications channel over which the message processor receives the first authorization message.

6. The message processing server according to claim 5, wherein the message processor is configured to decrypt the another encrypted data layer without exposing the reference data value outside the message processor.

7. The message processing server according to claim 1, wherein the first data pointer identifies a payer financial institution, the first authorization message identifies a payee financial institution, and the message processor is configured to validate the first data pointer by transmitting to a computer server a funds transfer authorization including the first data pointer and authorizing a funds transfer from the payer financial institution to the payee financial institution in an amount of the second data value, and receiving from the computer server a confirmation of the funds transfer in the amount of the second data value.

8. The message processing server according to claim 1, wherein the first encrypted data layer includes a second of the encrypted data layers, the second encrypted data layer includes a second data pointer, and the message processor is configured to, subsequent to receiving the first authorization message,
  receive a second authorization message including a second cryptographic key and a third data value;
  derive a second decrypted data layer by decrypting, with the second cryptographic key, the second encrypted data layer of the first decrypted data layer of the one multi-layer token; and
  validate the second data pointer of the second decrypted data layer by confirming the second data pointer pointing to a database entry comprising a maximum data value not less than the third data value.

9. The message processing server according to claim 8, wherein the message processor is configured to validate the second data pointer by transmitting to the computer server a funds transfer authorization including the second data pointer and authorizing a funds transfer from the payer financial institution to the payee financial institution in an amount of the third data value, and receiving from the computer server a confirmation of the funds transfer in the amount of the third data value.

10. A method of recovering data, the method being executable on a computer having a memory, the method comprising the computer:
  storing in the memory a token database of multi-layer tokens, each said multi-layer token including a plurality of encrypted data layers, a first of the encrypted data layers including a first data pointer, another of the encrypted data layers including the first encrypted data layer and identifying a reference data value;
  receiving, from a communications device, an authentication request identifying a first data value;
  validating the authentication request by (i) deriving one decrypted data layer by decrypting the another encrypted data layer of one of the multi-layer tokens, and (ii) confirming that the first data value is not greater than the reference data value configured in the one decrypted data layer;
  receiving, from the communications device, a first authorization message including a first cryptographic key;
  deriving a first decrypted data layer by decrypting, with the first cryptographic key, the first encrypted data layer of the one decrypted data layer; and
  validating the first data pointer by confirming the first data pointer pointing to a database entry comprising a second data value, wherein the second data value is less than the reference data value.

11. The method according to claim 10, wherein the validating the authentication request comprises the computer receiving a valuation message identifying an adjustment value, updating the reference data value with the adjustment value, and validating the authentication request from the first data value and the updated reference data value.

12. The method according to claim 11, wherein the updating the reference data value comprises the computer decrypting the another encrypted data layer with a master cryptographic key, updating the reference data value to include the adjustment value, and applying the master cryptographic key, the first encrypted data layer and the updated reference data value as inputs to a cryptographic algorithm.

13. The method according to claim 12, wherein the updating the reference data value comprises the computer incorporating the adjustment value into the first encrypted data layer of the one multi-layer token.

14. The method according to claim 10, wherein the providing the first cryptographic key comprises the computer providing the communications device with the first cryptographic key via a communications channel distinct from a communications channel over which the message processor receives the first authorization message.

15. The method according to claim 14, wherein the deriving a first decrypted data layer comprises the computer decrypting the another encrypted data layer without exposing the reference data value outside the computer.

16. The method according to claim 10, wherein the first data pointer identifies a payer financial institution, the first authorization message identifies a payee financial institution, and the validating the first data pointer comprises the computer transmitting to a computer server a funds transfer authorization including the first data pointer and authorizing a funds transfer from the payer financial institution to the payee financial institution in an amount of the second data value, and receiving from the computer server a confirmation of the funds transfer in the amount of the second data value.

17. The method according to claim 10, wherein the first encrypted data layer includes a second of the encrypted data layers, the second encrypted data layer includes a second data pointer, and the method further comprises subsequent to receiving the first authorization message:
  the computer receiving a second authorization message including a second cryptographic key and a third data value;
  the computer deriving a second decrypted data layer by decrypting, with the second cryptographic key, the second encrypted data layer of the first decrypted data layer of the one multi-layer token; and
  the computer validating the second data pointer by confirming the second data pointer pointing to a database entry comprising a maximum data value not less than the third data value.

18. The method according to claim 17, wherein the validating the second data pointer comprises the computer transmitting to the computer server a funds transfer authorization including the second data pointer and authorizing a funds transfer from the payer financial institution to the payee financial institution in an amount of the third data value, and receiving from the computer server a confirmation of the funds transfer in the amount of the third data value.

19. A tangible non-transient computer-readable medium storing computer processing instructions which, when executed by a computer, cause the computer to perform a method comprising:
  storing in a computer memory a token database of multi-layer tokens, each said multi-layer token including a plurality of encrypted data layers, a first of the encrypted data layers including a first data pointer, another of the encrypted data layers including the first encrypted data layer and identifying a reference data value;

receiving, from a communications device, an authentication request identifying a first data value;

validating the authentication request by (i) deriving one decrypted data layer by decrypting the another encrypted data layer of one of the multi-layer tokens, and (ii) confirming that the first data value is not greater than the reference data value configured in the one decrypted data layer;

receiving, from the communications device, a first authorization message including a first cryptographic key, deriving a first decrypted data layer by decrypting, with the first cryptographic key, the first encrypted data layer of the one decrypted data layer; and validating the first data pointer by confirming the first data pointer pointing to a database entry comprising a second data value, wherein the second data value is less than the reference data value.

20. The computer-readable medium according to claim 19, wherein the first encrypted data layer includes a second of the encrypted data layers, the second encrypted data layer includes a second data pointer, and the method further comprises subsequent to receiving the first authorization message:

receiving a second authorization message including a second cryptographic key and a third data value;

deriving a second decrypted data layer by decrypting, with the second cryptographic key, the second encrypted data layer of the first decrypted data layer of the multi-layer token; and validating the second data pointer by confirming the second data pointer pointing to a database entry comprising a maximum data value not less than the third data value.

* * * * *